United States Patent [19]

Sayanagi

[11] Patent Number: 4,614,967
[45] Date of Patent: Sep. 30, 1986

[54] METHOD AND APPARATUS FOR REPRODUCING A COLOR IMAGE USING ADDITIVE AND SUBTRACTIVE PRIMARY COLORS

[75] Inventor: Kazuo Sayanagi, Yokohama, Japan

[73] Assignee: Canon Kabushiki Kaisha, Tokyo, Japan

[21] Appl. No.: 501,567

[22] Filed: Jun. 6, 1983

[30] Foreign Application Priority Data

Jun. 14, 1982 [JP] Japan .............................. 57-102586

[51] Int. Cl.$^4$ .................. H04N 1/46; G03F 3/08; G01D 15/16; G01D 15/18
[52] U.S. Cl. ...................................... 358/75; 358/79; 346/140 R
[58] Field of Search ................... 358/75, 77, 78, 79, 358/80; 346/105, 106, 1.1, 140 PD; 356/402, 405, 406, 407, 416

[56] References Cited

U.S. PATENT DOCUMENTS

| | | | |
|---|---|---|---|
| 3,526,704 | 9/1970 | Heller | 358/75 |
| 3,555,262 | 1/1971 | Shimada | 358/79 |
| 3,995,279 | 11/1976 | Wiesmuller et al. | 358/75 |
| 4,463,374 | 7/1984 | Thompson | 358/75 |
| 4,481,528 | 11/1984 | Peck | 358/75 |

Primary Examiner—James J. Groody
Assistant Examiner—Randall S. Svihla
Attorney, Agent, or Firm—Fitzpatrick, Cella, Harper & Scinto

[57] ABSTRACT

A method of recording a color image uses both additive primary colors (that is, red, green, and blue) and subtractive primary colors (that is, cyan, magenta and yellow), as well as white and black. These eight colors are used to provide a dot matrix representing one picture element of the image, wherein each picture element is represented by a predetermined number of dots of an additive primary color, a predetermined number of dots of a subtractive primary color and, if appropriate, predetermined numbers of white and black dots. The dots do not overlap.

5 Claims, 11 Drawing Figures

METHOD AND APPARATUS FOR REPRODUCING A COLOR IMAGE USING ADDITIVE AND SUBTRACTIVE PRIMARY COLORS

BACKGROUND OF THE INVENTION

1. Field of the Invention

The present invention relates to a method and an apparatus for reproducing a color image by printing a plurality of color dots.

2. Description of the Prior Art

Figure 1:
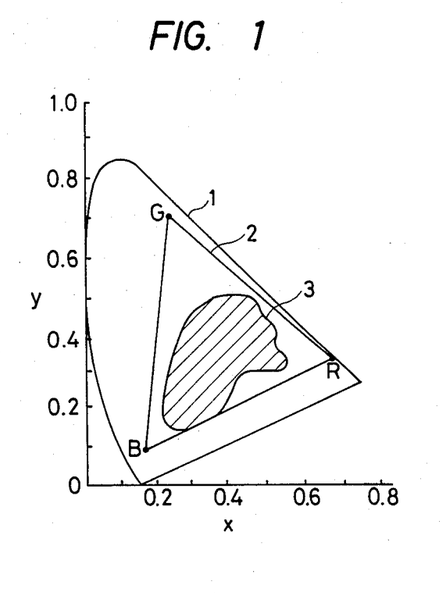
FIG. 1 is the XYZ chromaticity diagram.

Either the additive primaries (blue, green and red) alone or the subtractive primaries (cyan, magenta, and yellow) alone are generally used for color reproduction. Any desired color theoretically can be obtained by selectively overlaying the subtractive primaries, as is performed in multicolor printing. When all subtractive primaries are overlaid, a black image is produced. On the other hand, light beams of the additive primaries can be selectively mixed theoretically to produce any desired color, as is performed in color television. When all additive primaries are overlaid, a white image is produced. FIG. 1 shows the XYZ chromaticity diagram. An area 1 indicates the entire range of all possible colors; an area 2 indicates the range of colors which actually can be reproduced in color television using only the additive primaries; and an area 3 indicates the range of colors which actually can be reproduced in multicolor printing using only the subtractive primaries. Points B, G and R correspond to blue, green and red of the additive primaries, respectively. As may be apparent from FIG. 1, the additive primaries have a color reproduction range wider than that of the subtractive primaries since color characteristics of the subtractive primaries are not as good as those of the additives primaries. It should also be noted that the extent of the area 3 in FIG. 1 may vary slightly depending on the actual inks used.

However, when only the additive primaries are used, and the original to be reproduced has high luminance and high saturation, either luminance or saturation must be sacrificed in color reproduction. As a result, accurate image printing cannot be performed, resulting in poor image reproduction.

SUMMARY OF THE INVENTION

The present invention has been made in consideration of the conventional drawback described above and has for its object to provide a method and an apparatus for reproducing a color image wherein the color reproduction range is wide and more accurate color reproduction can be performed.

It is another object of the present invention to provide a method and an apparatus for reproducing a color image wherein a halftone color image can be reproduced without sacrificing either luminance or saturation.

It is still another object of the present invention to provide a method and an apparatus for reproducing a color image using a simple printer which does not require overlapping color dots as used in conventional color image printing.

It is still another object of the present invention to provide a method and an apparatus for reproducing a color image so as to perform color image printing on the basis of various types of image information.

Other objects, features and advantages of the present invention will be apparent from the following description taken in conjunction with the accompanying drawings.

DETAILED DESCRIPTION OF THE PREFERRED EMBODIMENT

In order to best understand the present invention, its principle will be described before a preferred embodiment is described.

According to the present invention, color dots of both the subtractive primaries (cyan, magenta and yellow) and the additive primaries (blue, green and red) are used together to perform color image reproduction.

Figure 2:
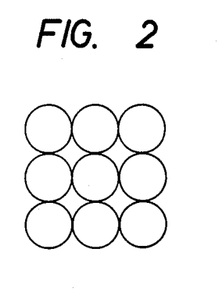
FIG. 2 illustrates one picture element provided in accordance with the principle of the present invention.

Assume that one picture element comprises nine dots which do not overlap each other, arranged in a 3×3 matrix as shown in FIG. 2. In order to reproduce a red which has high luminance and low saturation, printing is performed, for example, by using seven white dots and two red dots among the nine dots. In order to reproduce a red which has high saturation, nine red dots must be used. In the same way, nine yellow dots can be used to reproduce yellow, but usually yellow having high luminance is reproduced using a few white dots with the remaining dots being yellow and yellow having low luminance is reproduced using a few black dots with the remaining dots being yellow. It should be noted that a plurality of color components must not overlap each other with respect to a single dot. It should also be noted that individual dots, including black and white color information, are herein called color points.

In this manner, a combination of six colors (additive and subtractive primaries) is used in accordance with the luminance and saturation of the image, thereby reproducing a color which cannot be reproduced by either the additive primaries alone or the subtractive primaries alone. In practice, black and/or white are also used to reproduce a halftone image.

Figure 3:
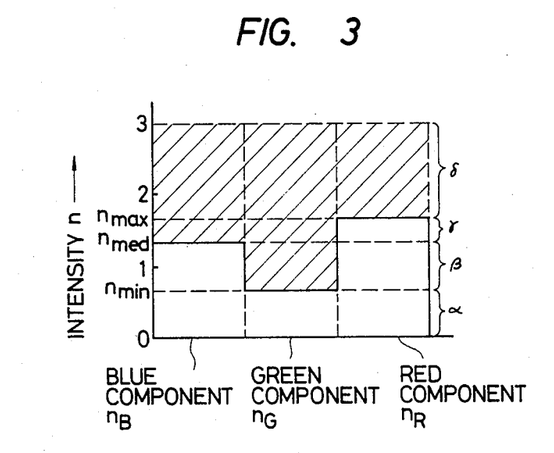
FIG. 3 shows the intensity distribution of color components.

FIG. 3 shows an intensity distribution of blue, green and red components obtained by a known color separator (using a color filter, a dichroic mirror and so on) at one point of the original image. Referring to FIG. 3, the color components are processed to have a maximum intensity n of "3".

A case will be described wherein color reproduction is performed using the obtained color components (blue component intensity $n_B=4/3$, green component intensity $n_G=\frac{2}{3}$, and red component intensity $n_R=5/3$). If the image is printed on a white paper sheet, white need not be used for reproduction of the white color points. Therefore, seven color components (the additive primaries, the subtractive primaries and the black component) are used.

As shown in FIG. 3, when the intensities n of three color components vary, an intensity $\alpha$ (obtained by multiplying a minimum intensity $n_{min}$ among the intensities n of the three color components by 3), which includes all the intensities n of the three color components, is defined as an intensity of the white component at the time of color reproduction. It should be noted that no white color component is reproduced if the intensity n of any one of the components is given as "0". It should also be noted that the white component has an intensity three times the intensity n of any one of the color components if all three of the color components have the same intensity.

An intensity $\beta$ (obtained by multiplying a difference between an intermediate intensity $n_{med}$ of the intensities of the three color components and the minimum intensity $n_{min}$ by 3), which includes intensities of any two of the three color components, is an intensity of a complementary color of the color component having the minimum intensity $n_{min}$ at the time of color reproduction.

An intensity $\gamma$ (obtained by multiplying a difference between a maximum intensity $n_{max}$ of the intensities of the three color components and the intermediate intensity $n_{med}$ by 3), which includes only one of the intensities of the three color components, is an intensity of the color component having the maximum intensity $n_{max}$ at the time of color reproduction.

When a difference between the maximum intensity $n_{max}$ and the maximum intensity of "3" is multiplied by 3, an intensity $\delta$ of the black color component at the time of color reproduction is obtained.

The ratio of color components (the white component: the magenta component as the complementary color of the green component: the red component: the black component) is 2 : 2 : 1 : 4 at the time of color reproduction.

Figure 4:
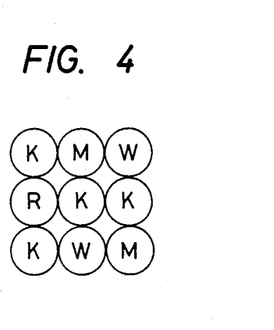
FIG. 4 illustrates a multicolor picture element which exemplifies color reproduction according to the present invention.

The values thus obtained correspond to the number of dots shown in FIG. 2, respectively. The color points are assigned to the dots in accordance with the number thereof within a unit area. In this case, points of the same color should not be adjacent to each other in order to perform good halftone and color reproduction. FIG. 4 shows an example of printing positions of the color points. Referring to FIG. 4, reference symbol K denotes a black dot; W, a white dot (no printing performed); R, a red dot; and M, a magenta dot.

Figure 5:
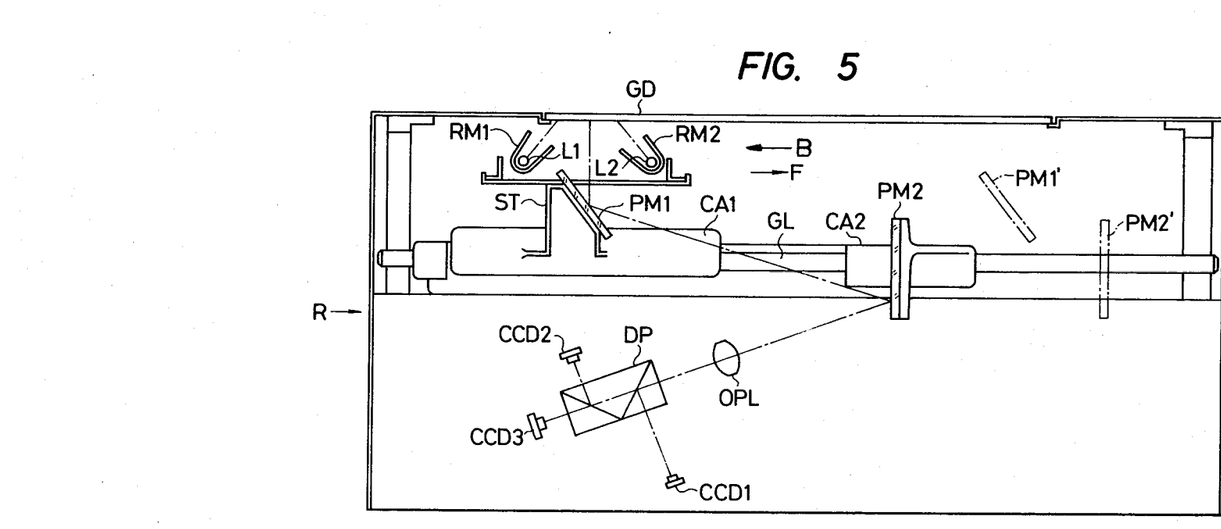
FIG. 5 is a sectional view of a reader for performing color separation of an original image.

FIG. 5 is a schematic sectional view showing the overall construction of a reader R for performing color separation of the original image according to an embodiment of the present invention. An original table GD made of glass or the like is disposed at the upper portion of the reader R. A user places an original to be copied on the original table GD. Rod-shaped light sources L1 and L2, such as fluorescent lamps, are disposed below the original table GD to illuminate the original. Reflection mirrors RM1 and RM2 are disposed to illuminate the original placed on the original table GD with light beams from the light sources L1 and L2. First and second plane mirrors PM1 and PM2 are disposed to subscan the original. The light beams reflected by the plane mirror PM2 are incident on an optical lens OPL. The focused light beams focused by the lens OPL are incident on a dichroic mirror assembly DP which performs color separation. The three color components are then incident on image sensors (one-dimensional charge-coupled devices) CCD1, CCD2 and CCD3, respectively, so as to detect the respective intensities of the separated components.

The light sources L1 and L2, the reflection mirrors RM1 and RM2 and the first plane mirror PM1 are formed integrally with a support ST. The support ST is fixed on a carriage CA1. The carriage CA1 is movable along a guide rail GL from left to right (forward or F direction), and is also movable therealong from right to left (backward or B direction). The second plane mirror PM2 is movable by a carriage CA2 together with the first plane mirror PM1 along the guide rail GL at a speed equal to half the speed of the first plane mirror PM1. In forward movement, the first and second plane mirrors PM1 and PM2 are moved to positions indicated by the alternate long and short dashed lines and denoted by PM1' and PM2'. In this manner, the length of the optical path from the original table GD to the optical lens OPL by way of the first and second plane mirrors PM1 and PM2 is kept constant. The main scanning direction of the image sensors CCD1, CCD2 and CCD3 corresponds to the direction vertical to the plane of FIG. 5. The distances between the optical lens OPL and the respective image sensors CCD1, CCD2 and CCD3 are the same. When signals from the light-receiving elements of the image sensors CCD1, CCD2 and CCD3 are read out in a proper order while the first and second plane mirrors PM1 and PM2 are moved in the forward direction, the red, green and blue components can be detected by the image sensors CCD1, CCD2 and CCD3, respectively.

Figure 6:
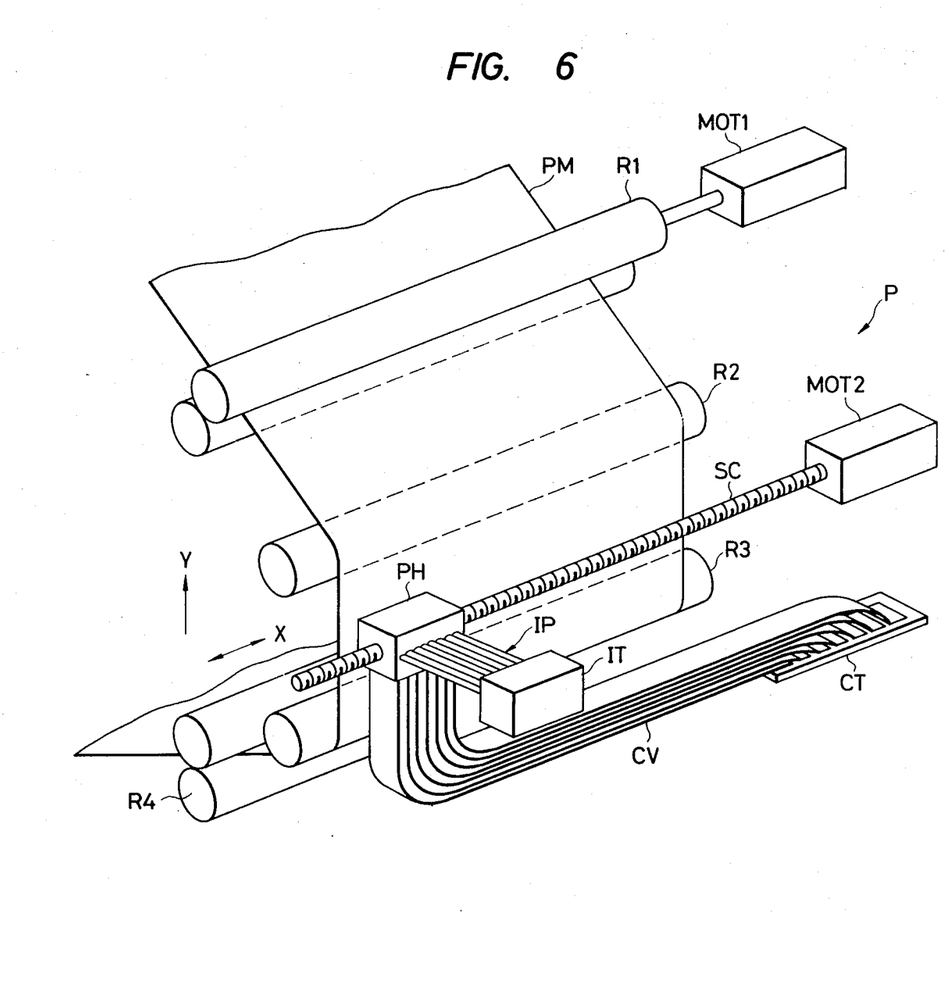
FIG. 6 is a perspective view of a multicolor printer according to an embodiment of the present invention.

FIG. 6 is a schematic perspective view showing the main part of a multicolor printer P according to the embodiment of the present invention. The multicolor printer P prints color points (the additive primaries, the subtractive primaries, and black) on a printing medium such as paper in accordance with ink jet printing.

Referring to FIG. 6, conveyor rollers R1 clamp a printing medium PM therebetween. When each of the conveyor rollers R1 is rotated in one direction, the printing medium PM is conveyed at a predetermined speed in the direction indicated by the arrow Y. A conveyor motor MOT1 drives the conveyor rollers R1. Intermediate rollers R2 and R3 are driven upon movement of the printing medium PM so as to feed and smooth the printing medium PM. Tension rollers R4 clamp the printing medium PM so as to maintain tension in the printing medium PM. An on-demand ink jet printing head PH has an ink jet unit JUT which has 21 ink jet ports for injecting color inks in a manner as indicated in FIG. 7.

Figure 7:
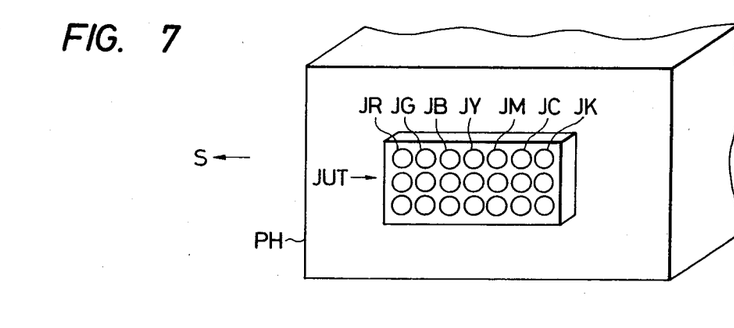
FIG. 7 is an enlarged view of a printing head.

Referring to FIG. 7, the ink jet unit JUT has three red ink jet ports JR, three green ink jet ports JG, three blue ink jet ports JB, three yellow ink jet ports JY, three magenta ink jet ports JM, three cyan ink jet ports JC, and three black ink jet ports JK. When the ink jet unit JUT is moved in the direction indicated by arrow S, printing is performed. An identical array of red, green, blue, yellow, magenta, cyan and black ink jet ports is arranged in each of three rows.

Referring again to FIG. 6, an ink tank IT stores seven color inks. Ink pipes IP supply the seven color inks from the ink tank IT to the printing head PH, respectively. Cables CV supply drive signals to the recording head PH so as to selectively inject the color inks from the 21 ink injection ports. A cable terminal CT is connected to the cables CV. A head feed motor MOT 2 drives the printing head PH which reciprocates along the directions indicated by arrows X at a predetermined speed. The motor MOT2 drives a screw SC to move the printing head PH along the directions indicated by arrows X. In this embodiment, printing is performed upon movement of the printing head PH to the right. When the printing head PH has reached the right end of the printing medium, the motor MOT2 is reversed, so that the printing head PH is moved to the left so as to return the printing head PH to the initial position.

The movement of the printing head PH is synchronized with the injection timing. Ink is injected every time the printing head PH is moved by a one-dot pitch so as to prevent double printing at a single position. As the printing head PH scans once, printing is performed for three lines. The printing medium PM is then fed by the conveyor rollers R1 by a three-dot pitch in the direction indicated by arrow Y. If feeding of the printing medium PM is performed while the printing head PH is moving in the reverse direction, the printing time can be shortened.

Figures 8, 9:
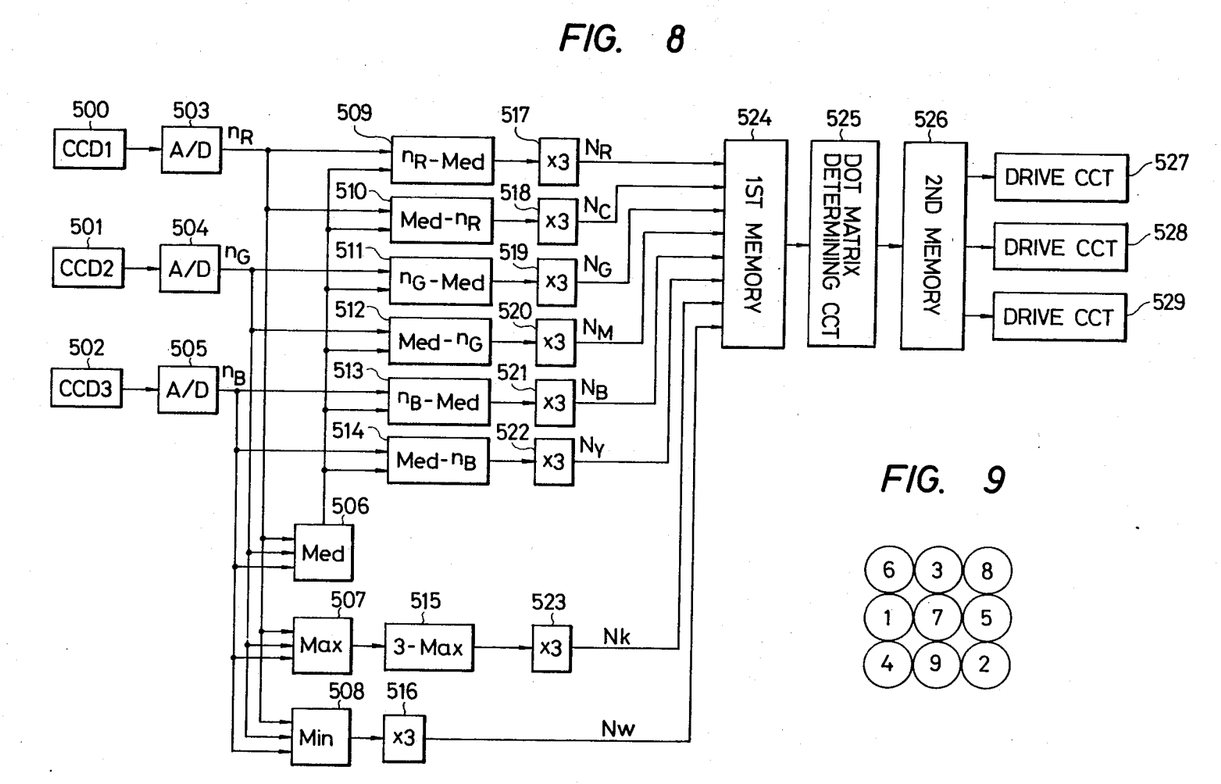
FIG. 8 is a block diagram of a color reproduction circuit according to the present invention.
FIG. 9 is a representation for explaining a method for determining a dot array.

FIG. 8 is a block diagram of a color reproduction circuit for performing color reproduction with the reader R (FIG. 5) and the printer P (FIG. 6).

Referring to FIG. 8, image sensors CCD1, CCD2 and CCD3 (FIG. 5) are designated by reference numerals 500, 501 and 502, respectively. Analog-to-digital converters (to be referred to as A/D converters) 503, 504 and 505 convert analog signals to digital signals of a predetermined number of bits, respectively. The analog image signal of the red component which is produced by the image sensor 500 is converted by the A/D converter 503 to a digital image signal $n_R$ of the red component. The analog image signals of the green and blue components which are produced by the image sensors 501 and 502 are converted by the A/D converters 504 and 505 to digital image signals $n_G$ and $n_B$ of the green and blue components, respectively.

The digital image signals $n_R$, $n_G$ and $n_B$ from the A/D converters 503, 504 and 505, respectively, are supplied to a minimum value detector 508. A minimum value Min is detected by the minimum value detector 508. The minimum value Min is supplied to a multiplier 516 and is multiplied by 3. A multiplied output signal from the multiplier 516 is a digital image formation signal $N_W$ of the white component.

The digital signals $n_R$, $n_G$ and $n_B$ from the A/D converters 503, 504 and 505, respectively, are also supplied to a maximum value detector 507. A maximum value Max is detected by the maximum value detector 507. The maximum value Max is supplied to a subtractor 515. The subtractor 515 subtracts the maximum value Max from "3". A subtracted output signal from the subtractor 515 is multipled by a multiplier 523 by 3. A multiplied signal is given as a digital image formation signal $N_K$ of the black component.

The digital image signals $n_R$, $n_G$ and $n_B$ from the A/D converters 503, 504 and 505, respectively, are also supplied to an intermediate value detector 506. An intermediate value Med is detected by the intermediate value detector 506. The intermediate value Med is supplied to subtractors 509 to 514. It should be noted that the intermediate value Med corresponds to the maximum value Max or the minimum value Min if any two of the intensities of the three color components are the same.

Meanwhile, the digital image signal $n_R$ is supplied from the A/D converter 503 to the subtractors 509 and 510. The digital image signal $n_G$ is supplied from the A/D converter 504 to the subtractors 511 and 512. Similarly, the digital image signal $n_B$ is supplied from the A/D converter 505 to the subtractors 513 and 514.

Since the subtractors 509 to 514 also receive the intermediate value Med from the intermediate value detector 506, each of the subtractors 509, 511 and 513 subtracts the intermediate value Med from the corresponding digital image signal n, and each of the subtractors 510, 512 and 514 subtracts the corresponding digital image signal n from the intermediate value Med. Only the positive subtracted signals are output by the subtractors 509 to 514. For example, as will be appreciated more fully in view of the discussion below, if $n_R - \text{Med} > 0$ (see FIG. 3), $N_R$, the red color component, is printed, while if $n_R - \text{Med} < 0$, $N_C$, the cyan color component, is printed.

The output signals from the subtractors 509 to 514 are supplied to multipliers 517 to 522, respectively, and are multiplied by 3. These multiplied output signals from the multipliers 517 to 522 correspond to a digital image formation signal $N_R$ of the red component, a digital image formation signal $N_C$ of the cyan component, a digital image formation signal $N_G$ of the green component, a digital image formation signal $N_M$ of the magenta component, a digital image formation signal $N_B$ of the blue component, and a digital image formation signal $N_Y$ of the yellow component.

The digital image formation signals N of the respective color components thus obtained are stored in a first memory 524. The signal N indicates the number of dots of each color component to be printed at the time of color reproduction. The first memory 524 preferably has a capacity for storing data of the whole image. However, a memory having a capacity for storing a few lines may also be used.

A dot matrix determination circuit 525 determines dot positions of each color component in, for example, a 3×3 dot matrix in accordance with the values of the digital image formation signals N.

The value of the digital image formation signal corresponding to each color component and stored in the first memory 524 corresponds to dots to which the color component is assigned among the dots designated by numbers 1 to 9 according to the order shown in FIG. 9. For example, if $N_R=1$, $N_M=2$, $N_K=4$, and $N_W=2$, the red component is assigned to a dot 1, the magenta component is assigned to dots 2 and 3, the black component is assigned to dots 4 to 7, and the white component is assigned to dots 8 and 9 (in this embodiment, the white component corresponds to a nonprinting area). More particularly, the color components are assigned to the dots 1 to 9 in the order of red, magenta, magenta, black, black, black, black, white and white, as shown in FIG. 4. In general, the color components are assigned to the dots in the order of red, cyan, green, magenta, blue, yellow, black and white. However, the assignment order is not limited to the above order. Any proper order for performing good color reproduction and halftone reproduction may be selected. Each color point is assigned to a dot in the unit area (nine dots in this embodiment) in accordance with the value of the digital image formation signal stored in the first memory 524.

Assume that each color data is designated by 3-bit data; red, cyan, green, magenta, blue, yellow, black and white data are 001, 010, 011, 100, 101, 110, 111 and 000, respectively.

In the case described with reference to FIG. 9, the dot 1 corresponds to data 001, each of the dots 2 and 3 corresponds to data 100, each of the dots 4 to 7 corresponds to data 111, and each of the dots 8 and 9 corresponds to data 000.

A second memory 526 stores image signals at least corresponding to one scanning line scanned by the printing head PH shown in FIG. 6. These image signals are obtained by assigning the data by the dot assignment determination circuit in accordance with the dot matrix in the unit area. Assume that the 3×3 dot matrix has an area (0.5 mm×0.5 mm) and that the printing head PH performs printing along a short side of a paper sheet of A4 size (210 mm×297 mm). The printing head PH performs printing covering 3780 dots (1260 dots×3 lines).

The second memory 526 stores, therefore, color data corresponding to at least 3780 dots. In other words, the second memory 526 has a 11340-bit capacity (3780 dots×3 bits).

Ink jet drivers 527, 528 and 529 drive the printing head PH. The ink jet driver 527 drives the ink jet ports aligned in the upper array; the ink jet drivers 528 drives the ink jet ports aligned in the intermediate array; and the ink jet driver 529 drives the ink jet ports aligned in the lower array, shown in FIG. 7. The ink jet driver 527 repeatedly receives 3-bit data for the dots 6, 3 and 8 (aligned in the upper array) from the second memory 526; the ink jet driver 528 repeatedly receives 3-bit data for the dots 1, 7 and 5 (aligned in the intermediate array) therefrom; and the ink jet driver 529 repeatedly receives 3-bit data for the dots 4, 9, 2 (aligned in the lower array) therefrom. The 3-bit data corresponding to the dots 6, 1 and 4 are simultaneously supplied to the ink jet drivers 527, 528 and 529, respectively. Then, the 3-bit data corresponding to the dots 3, 7 and 9 are simultaneously supplied to the ink jet drivers 527, 528 and 529, respectively. Subsequently, the 3-bit data corresponding to the dots 8, 5 and 2 are simultaneously supplied to the ink jet drivers 527, 528 and 529, respectively.

Thereafter, the 3-bit signals corresponding to the dots 6, 1 and 4, respectively, next to the 3-bit signals corresponding to the dots 8, 5 and 2 are supplied. The signals are repeatedly supplied to the corresponding drivers 420 times for each scanning of A4-size printing.

The input timing of the 3-bit signals is synchronized with one-dot movement of the printing head PH along the direction indicated by arrow X.

Figure 10:
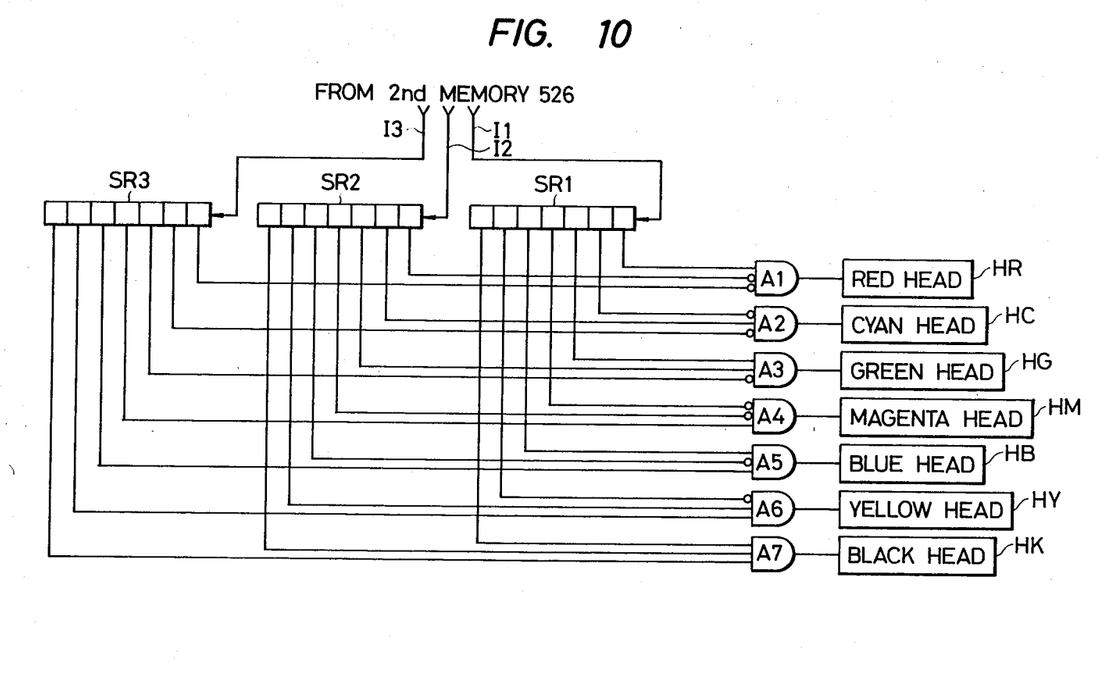
FIG. 10 is a detailed block diagram of a driver circuit.
Figure 11:
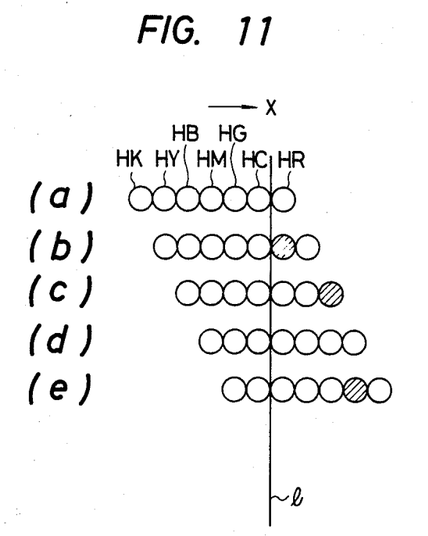
FIG. 11 illustrates color dot printing using the embodiment shown in FIGS 6–10.

FIG. 10 is a detailed block diagram of the ink jet driver 527 shown in FIG. 8. The ink jet drivers 528 and 529 have the same arrangement as the ink jet driver 527, and a detailed description thereof will be omitted. Each one of shift registers SR1, SR2 and SR3 comprises a 7-bit serial-in parallel-out shift register. The 3-bit signals are supplied from the second memory 526 to the shift registers SR1, SR2 and SR3 respectively through lines I1, I2 and I3 in units of dots. The printing head PH has 7-color ink jet ports in a 7×3 matrix. The shift registers SR1, SR2 and SR3 delay the signals such that printing is properly performed when the printing head reaches a predetermined position. Input terminals of AND gates A1 to A7 which are marked with circles indicate inverting input terminals. The AND gates go high when they receive the 3-bit signals, respectively. The individual color inks are injected from the ink jet ports JR, JC, JG, JM, JB, JY and JK of red, cyan, green, magenta, blue, yellow and black heads HR, HC, HG, HM, HB, HY and HK. When each injection head receives a high-level signal from the corresponding AND gate, the corresponding ink is injected from the corresponding port. The 3-bit signals are simultaneously supplied to the lines I1, I2 and I3 from the LSB to the MSB such that each line receives one bit at a time. For example, as shown in FIG. 11, assume that recording is performed for one dot at a time in an order of cyan, white, red and cyan. Printing positions of the respective injection heads are designated by HR, HC, HG, HM, HB, HY and HK. The printing head PH moves in the direction indicated by arrow X on a single line as time elapses in the order shown in FIGS. 11(a) to 11(e). Reference symbol l denotes the left end of the printing medium PM. At time (a), the 3-bit data 010 indicating cyan is read out from the second memory 526, an output signal supplied from the shift register SR1 to the AND gate A1 is set at logic level "0", an output signal supplied from the shift register SR2 to the AND gate A1 is set at logic level "1", and an output signal supplied from the shift register SR3 to the AND gate A1 is set at logic level "0". The AND gate A1 is kept OFF. As a result, the red head HR is not operated. In this condition, the other four injection heads are kept OFF. On the other hand, the AND gate A1 is turned on only when the red signal is supplied thereto. In other words, when the AND gate A1 receives the signals of logic level "1", "0" and "0" respectively from the shift registers SR1, SR2 and SR3, the AND gate A1 supplies an output signal of high level to the red head HR.

When the printing head PH is moved by the one-dot pitch in the direction indicated by arrow X, and then the 3-bit signal 000 indicating white is supplied at time (b), the 3-bit signal of white is supplied to the AND gate A1, and the 3-bit signal of cyan is supplied to the AND gate A2. Only the AND gate A2 is turned on to inject the cyan ink, so that the cyan head HC indicated by the hatched line is actuated.

When the printing head PH is moved again by the one-dot distance in the direction indicated by arrow X, and then the 3-bit signal 001 indicating red is supplied at time (c), the AND gate A1 receives the 3-bit signal of red, the AND gate A2 receives the 3-bit signal of white, and the AND gate A3 receives the 3-bit signal of cyan. Only the AND gate A1 goes high level to inject the red ink, so that only the red head HR is actuated.

When the printing head PH is moved again by the one-dot pitch in the direction indicated by arrow X, and then the 3-bit signal 010 of cyan is supplied at time (d), the 3-bit signals of cyan, red, white and cyan are supplied to the AND gates A1, A2, A3 and A4, respectively. All the AND gates are set at low level. No injection head is actuated.

When the printing head PH is moved again by the one-dot pitch in the direction indicated by arrow X, and then the 3-bit signal is supplied at time (e), the AND gates A2, A3, A4 and A5 receive the 3-bit signals of cyan, red, white and cyan, respectively. Only the AND gate A2 goes high, so that only the cyan head HC indicated by the hatched line is actuated.

In this manner, cyan, white (nothing is printed), red and cyan dots are consecutively formed from the left end of the printing medium without overlapping of the adjacent dots.

The injection heads aligned in the intermediate and lower arrays are operated in the same manner as described above in accordance with the corresponding 3-bit signals.

When the injection head is shifted to a predetermined position, the corresponding 3-bit signal is supplied to turn on the corresponding AND gate. In this case, the printing head PH is moved by the one-dot pitch in the direction indicated by arrow X as previously described. Therefore, the predetermined color dot corresponding to the dot determined by the dot matrix determination circuit 525 may not overlap any other color dot, thus preventing double printing.

In the above embodiment, the unit area is constituted by a 3×3 dot matrix. However, the unit area is not limited to this matrix formation. For example, a 4×4 matrix or a 5×5 matrix may be used as the unit area. Furthermore, if the number of color points in the unit area is increased, a color reproduction range of the present invention may be further widened.

Furthermore, in order to print a color image on a colored paper sheet excluding white-colored paper, eight color components including white may be used. In addition to the above advantages, the present invention may also be applied to a thermal transfer printing apparatus or an electrophotographic recording apparatus in addition to any other ink jet printing apparatus.

Furthermore, all of the additive and subtractive primaries need not be used. For example, a combination of all the additive primaries and any one or two of the subtractive primaries may be used for color printing.

Furthermore, a video communication signal and a video signal read out from a memory medium such as a magnetic disc and a tape may also be used for color printing, in addition to an image signal read out from an original.

A figure having any shape other than a circular shape may be used as the color point.

Any other method different from the method described in the above embodiment for determining the ratio of color points to be printed may be used. For example, the ratio may be determined by software of a known microcomputer.

As may be apparent from the above description, the method of the present invention can provide a color reproduction range wider than that of a method using either the additive primaries alone or the subtractive primaries alone, and can accurately reproduce an original image. Furthermore, since the color points may not overlap, the printed ink can be dried quickly, and ink may not be wasted. Furthermore, color points of black ink are effectively used, thereby providing a clear image.

Furthermore, according to the present invention, a complicated procedure is eliminated, unlike the conventional method wherein either lightness or saturation is sacrificed in color reproduction using either the additive primaries alone or the subtractive primaries alone.

What is claimed is:

1. A method for recording a full-color image, comprising the steps of:
    selecting eight colors, including three primary colors comprising an additive system of red, green and blue, three primary colors comprising a subtractive system of cyan, magenta and yellow, and white and black;
    determining the relative intensities of said eight colors in one picture element of the image to be recorded; and
    conducting color mixture recording to represent said one picture element based on the relative intensities of said eight colors therein by using colors chosen from one of said red, green and blue additive primary colors, one of said cyan, magenta and yellow subtractive primary colors, white and black, wherein said chosen colors are recorded as areas which do not overlap each other.

2. A method according to claim 1, wherein said one picture element is represented as a predetermined number of dots on which said chosen colors are recorded.

3. A method according to claim 1, wherein the image is recorded in accordance with an image signal in which the color information of an original image is represented by the additive primary colors alone.

4. A method according to claim 1, wherein the relative intensities of said eight colors are determined arithmetically.

5. Apparatus for reproducing a full-color image, comprising:
    means for providing three different color component image signals;
    means for determining from said three color component image signals the ratio of the intensity of each of the additive primary colors red, green and blue, the subtractive primary colors cyan, magenta and yellow, and the colors white and black to a unit intensity for a picture element of the image; and
    recording means for recording dots of colors chosen from one of said additive primary colors, one of said subtractive primary colors, white and black to represent the picture element in accordance with the intensity ratios obtained by said determining means, wherein the color dots are recorded without overlapping each other.

* * * * *